Feb. 3, 1942.   E. R. KANHOFER   2,271,645
CATALYTIC CRACKING OF HYDROCARBONS
Filed Jan. 22, 1940
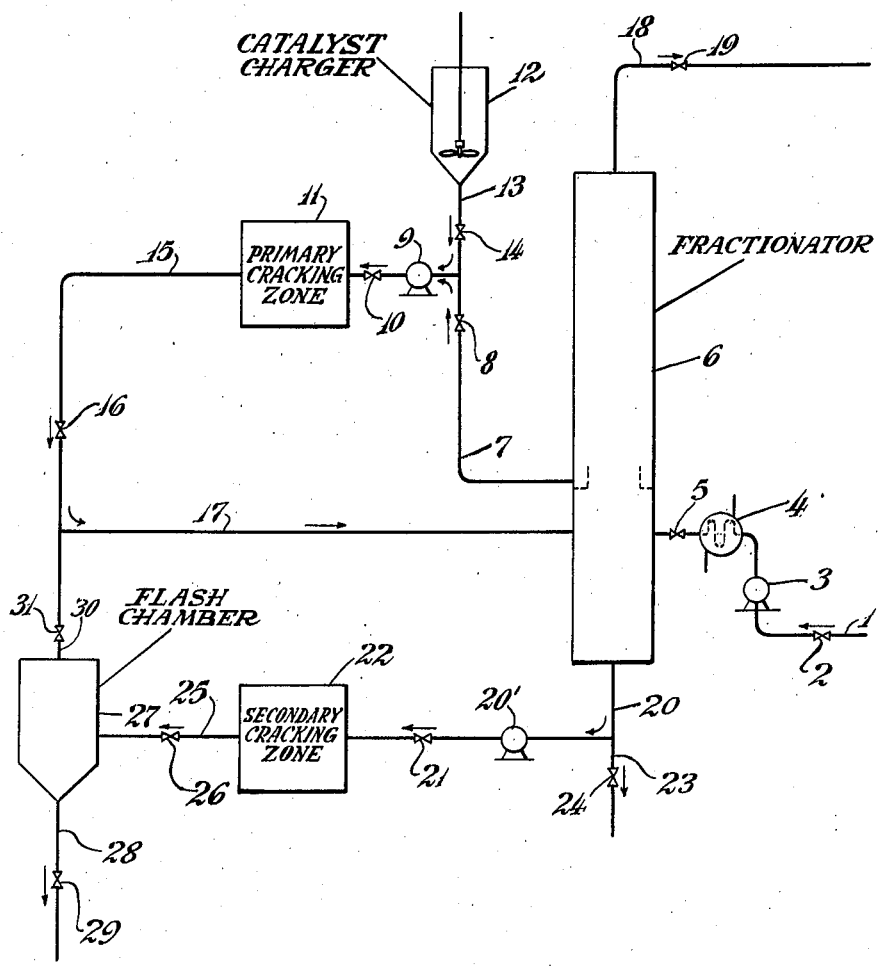
Inventor:
Elmer R. Kanhofer
By Lee J. Gary
A. Horney.

Patented Feb. 3, 1942

2,271,645

UNITED STATES PATENT OFFICE 2,271,645

CATALYTIC CRACKING OF HYDROCARBONS

Elmer R. Kanhofer, Chicago, Ill., assignor to Universal Oil Products Company, Chicago, Ill., a corporation of Delaware Application January 22, 1940, Serial No. 314,943

4 Claims. (Cl. 196—48)

This invention relates to a process for converting hydrocarbon oil into valuable products including high anti-knock gasoline by treatment of said hydrocarbon oil with a powdered catalytic agent under suitable conditions to bring about cracking thereof.

The use of catalytic agents to assist the thermal decomposition of hydrocarbon oils such as those of petroleum origin into high yields of gasoline and other valuable products has been practiced. Among the agents employed are the reduced metal catalysts including iron, cobalt, nickel, etc., which are subject to a number of disadvantages including the fact that they are poisoned by sulfur compounds which may be present in oils undergoing conversion, and furthermore that they tend to promote gas and carbon-forming reactions with the net result that the catalyst life is comparatively short. Another type of cracking catalyst is the activated earth type in which naturally occurring clays are used which have been treated with acids or other chemicals to increase their catalytic activity.

Still another type of catalyst is made up of activated alumina or magnesia which may have deposited thereon various promoting oxides from the left-hand column of the 4th, 5th and 6th groups of the Periodic Table and include particularly such oxides as those of chromium, molybdenum, vanadium, etc.

A further type of catalyst, which is the preferred material of this invention is the so-called silica-alumina, silica-zirconia and silica-alumina-zirconia composite which is manufactured by the separate or simultaneous precipitation of the component compounds followed by washing, drying and calcining steps whereby a finished catalyst is prepared. The catalysts are prepared under such conditions that alkali-metal ions are substantially eliminated in order to obtain adequate catalytic activity and stability insofar as an extended life is concerned.

In one specific embodiment the present invention comprises a process for converting hydrocarbon oil into valuable products including high antiknock motor fuel which comprises charging said hydrocarbon oil to a fractionator, removing an intermediate boiling fraction therefrom, passing said fraction together with a powdered cracking catalyst to a primary cracking zone under conditions of temperature and pressure adequate to effect substantial catalytic cracking thereof, returning the reaction products together with partially spent catalyst in suspension to said fractionator, removing the fractionator bottoms containing said partially spent catalyst in suspension, passing said bottoms to a secondary cracking zone under conditions of temperature and pressure adequate to effect substantial catalytic cracking thereof, supplying the reaction products containing spent cracking catalyst in suspension to a flashing zone, removing a vaporous portion of said reaction products from the flashing zone and returning them to said fractionator, withdrawing a residual portion of said reaction products containing spent cracking catalyst in suspension, and recovering the gasoline and gas from said fractionator.

The process is illustrated in diagrammatic form in the attached drawing which has not been made to scale nor has any attempt been made to proportionate the various parts of the equipment.

Hydrocarbon oil such as a distillate fraction of petroleum or other hydrocarbon oil, crude oil or topped crude oil is introduced through line 1, valve 2, pump 3, heat exchanger 4, valve 5 and fractionator 6. An intermediate boiling fraction which may comprise kerosene, gas, oil, naphtha or a distillate including this entire boiling range of oils is withdrawn through line 7, valve 8, pump 9, and valve 10 to primary cracking zone 11. Powdered catalytic material may be introduced from catalyst charger 12 through line 13 and valve 14. The primary cracking zone 11 may consist of a preheating coil followed by a suitable reactor which may be any type of reactor adaptable to use with powdered catalysts. This includes a tubular coil disposed in a heating zone or a vertical type of reactor containing contacting members such as baffles, bubble trays, etc. The catalytic cracking step is carried out at a temperature within the range of 500–1200° F. and a pressure of the order of 50–1000 pounds per square inch or higher. The exact choice of conditions will depend to a large extent upon the stock being processed and the character of the product which is to be obtained. For example, when operating at relatively elevated pressures of the order of 100–1000 pounds per square inch and a temperature of about 500–900° F., a substantially olefin-free gasoline is produced. When operating at temperatures in excess of 900° F., a more olefinic type of gasoline is produced. The latter type usually has a somewhat higher octane number and the former type of gasoline is more suitable for use in aviation motor fuels because of the low olefin content and the relatively higher susceptibility to tetraethyl lead. The reaction products including the partially spent catalyst are withdrawn through line 15, valve 16 and line 17 to fractionator 6. Gasoline and gas are removed through line 18 and valve 19 through suitable heat exchangers, condensers, etc., not shown in interests of simplifying the drawing. Fractionator bottoms are withdrawn through line 20, pump 20' and valve 21 to the secondary cracking zone 22 which may be similar in construction to the primary cracking zone 11 or may be somewhat different in order to compensate for the different character of the stock being processed. The conditions of cracking are within the range mentioned for the primary cracking zone, but need not be exactly the same as those chosen for the primary zone, but instead may be suitably adjusted to permit optimum operation for a stock of the character of that being charged and also to compensate for the reduced activity of the cracking catalyst which has been partially spent by use in the primary step. The conditions here will also depend upon the stock being processed and the character of the products desired. In general when heavy oils are being charged so that the fractionator bottoms are of a high boiling type somewhat milder conditions are employed than in the primary zone wherein the lower boiling and consequently more refractory oils are processed. On the other hand, the activity of the catalyst is somewhat reduced so that it may be necessary to increase the temperature or to decrease the space velocity somewhat in order to obtain adequate conversion. Line 23 and valve 24 serve as a means of draining fractionator 6 or of withdrawing a portion of the fractionator bottoms. The reaction products from secondary cracking zone 22 pass through line 25 and valve 26 to flash chamber 27. Normally the products are introduced near the bottom of the flash chamber at a point below the surface of a liquid level maintained therein. This assists in keeping the catalyst in suspension, thus preventing plugging of the outlet line and also permits additional reaction since the temperature maintained is usually within the range at which some catalytic cracking will occur. The spent catalyst suspended in residual oil is withdrawn through line 28 and valve 29 to a suitable separator from which the catalyst is recovered and may be reactivated by treatment with an oxygen-containing gas at a temperature in excess of 900° F. to remove carbonaceous deposits therefrom. The residual oil may be used for fuel or may be coked in a separate coking apparatus. A vaporous portion of the reaction products pass from flash chamber 27 through line 30, valve 31 and line 17 to fractionator 6. The gasoline produced in this step together with that from the primary step is removed as previously described through line 18 and valve 19.

The following example is given to illustrate the usefulness and practicability of my process, but should not be construed as limiting it to the exact conditions indicated therein.

A topped Mid-Continent crude oil may be charged to the fractionator as described and a fraction boiling within the range of approximately 400–800° F. removed, mixed with a finely divided silica-alumina cracking catalyst and cracked at a temperature of 975° F. and an average pressure of 200 pounds per square inch. Approximately 6% by weight of catalyst may be used and the catalyst introduced into the oil in the form of a slurry in a small amount of water. The reaction products are returned to the fractionator and a residual fraction withdrawn to the secondary cracking zone which may comprise a tubular coil disposed in a heating zone and which may be maintained at a temperature of 932° F. and a pressure of 250 pounds per square inch. The reaction products are passed to the flash chamber which is maintained at a temperature of 875° F. and a pressure of 50 pounds per square inch. A liquid level may be maintained in the flash chamber and the reaction products introduced at a point about one-fourth of the distance from the bottom of the flash chamber so that the vaporous portion passes upward through the liquid residue. The vapors are returned to the fractionator and the residue containing spent catalyst in suspension is withdrawn from the flash chamber. The cracking catalyst may be separated and reactivated by treatment with an oxygen-containing gas at a temperature of 1000° F. The reactivated catalyst may then be returned to the system. The separated oil is suitable for use as an industrial fuel oil. A 400° F. end point gasoline of 77 octane number is obtainable. In addition, a gas containing polymerizable gaseous olefins is obtained which is a source of additional high antiknock motor fuel. The total yield of gasoline including that produced from the polymers may amount to 63% of the original charge.

I claim as my invention:

1. A hydrocarbon oil conversion process which comprises introducing the charging oil to a fractionating zone and therein fractionating the same together with cracked products, formed as hereinafter set forth, to form a gasoline-containing overhead product, a residual fraction containing unvaporized charging oil, and a condensate fraction boiling intermediate said overhead product and residual fraction, commingling a powdered cracking catalyst with said intermediate condensate fraction and subjecting the resultant mixture to catalytic cracking conditions, introducing the resultant conversion products and admixed catalyst to the fractionating zone, thereby commingling the catalyst with said residual fraction, removing the admixed residual fraction and catalyst from the fractionating zone and subjecting the same to independently controlled cracking conditions, separating the products of the last-mentioned step into vapors and residue, and supplying the separated vapors to the fractionating zone.

2. The process of claim 1 wherein the powdered cracking catalyst is selected from the group consisting of silica-alumina, silica-zirconia and silica-alumina-zirconia.

3. The process as set forth in claim 1 wherein the first and second-mentioned cracking steps are operated at a temperature within the range of approximately 500–1200° F. and a pressure within the range of approximately 50–1000 pounds per square inch.

4. A hydrocarbon oil conversion process which comprises introducing the charging oil to a fractionating zone and therein fractionating the same together with cracked products, formed as hereinafter set forth, to form a gasoline-containing overhead product, a residual fraction containing unvaporized charging oil, and a condensate fraction boiling intermediate said overhead product and residual fraction, commingling a powdered cracking catalyst with said intermediate condensate fraction and subjecting the resultant mixture to catalytic cracking conditions, introducing the resultant conversion products and admixed catalyst to the fractionating zone, thereby commingling the catalyst with said residual fraction, removing the admixed residual fraction and catalyst from the fractionating zone and subjecting the same to independently controlled cracking conditions, reducing the pressure on the products of the last-mentioned step and separating the same into vapors and residue, and supplying the separated vapors to the fractionating zone.

ELMER R. KANHOFER.